March 18, 1941.   J. BUCHHART   2,235,418
POWER TRANSMISSION
Filed Dec. 8, 1939
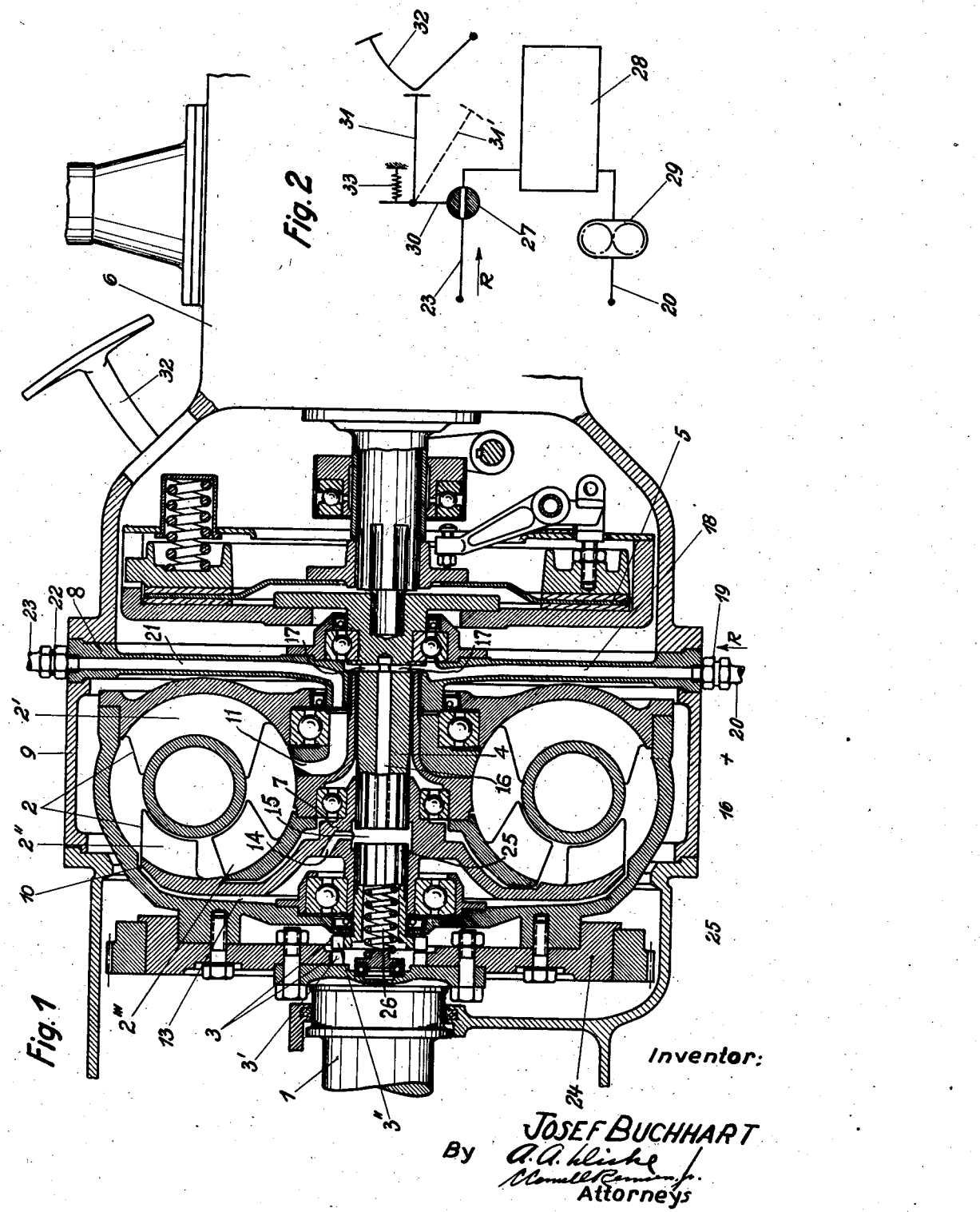
Inventor:
JOSEF BUCHHART
By
Attorneys Patented Mar. 18, 1941

2,235,418

UNITED STATES PATENT OFFICE 2,235,418

POWER TRANSMISSION

Josef Buchhart, Stuttgart-Zuffenhausen, Germany, assignor to Dr. Ing. h. c. F. Porsche K.-G., Stuttgart-Zuffenhausen, Germany, a company of Germany Application December 8, 1939, Serial No. 308,281
In Germany November 11, 1938

8 Claims. (Cl. 192—3.2)

This invention relates to an improvement in power transmission, and more particularly to the alternative transmission of power through fluid and mechanical drives.

An object of this invention is the improvement of a combined mechanical and fluid transmission.

Another object of this invention is the provision of a combined mechanical and fluid transmission, wherein the mechanical coupling is controlled by a pressure responsive device in circuit with the working or cooling fluid of the fluid transmission.

A further object of this invention is the provision of a combined mechanical and fluid transmission, in which the mechanical coupling is mounted co-axially within the center of the fluid coupling.

A still further object of this invention is the provision of an improved mechanical and fluid transmission, in which the control of the alternatively connected mechanical and fluid clutches is correlated with the engagement and disengagement of an additional serially connected clutch.

These and other features, capabilities and advantages of the invention will appear from the subjoined detailed description of one specific embodiment thereof, illustrated in the accompanying drawing, in which:

Fig. 1 is a longitudinal cross-sectional view through a power drive in accordance with this invention; and Fig. 2 shows schematically the manner in which the fluid transmission circuit is varied to effect control of the combined fluid-mechanical drive.

As seen in Fig. 1, the shaft 1, which is adapted to be connected to an engine or other source of power, acts to transmit this power either through a fluid transmission 2 or a mechanical clutch 3 to an intermediate driven shaft 4, which, through a suitable friction clutch is interconnected with an indicated speed change gear 6. The principles of this invention being particularly adaptable to power driven vehicles, but not necessarily so limited, the transmission 6 will, in a manner known to the art, deliver power to suitable driving wheels.

The fluid transmission 2 is of known type and preferably consists of an impeller element 2' which is drivably connected with the shaft 1, turbine element 2'', drivably connected with the intermediate driven shaft 4, and the relatively stationary members 2''' which are used to react with the members 2' and 2'' for the purposes of torque conversion. The invention is, however, usable without any change, if the fluid transmission is of the simple clutch type.

The mechanical clutch 3 is of the simple claw type having teeth 3' drivably interconnected with the shaft 1, and engageable teeth 3'' interconnected with the intermediate driven shaft 4.

The turbine elements 2'' of the fluid transmission 2 are preferably interconnected with the intermediate driven shaft 4 through an integral splined hub 7 which engages suitable cooperating splines on the intermediate shaft. The reaction elements 2''' are held stationary by suitable interconnection with the housing wall 8 of the transmission housing 9.

The fluid transmission is preferably formed with both cooling and working circuits. Connection is made to the internal working circuits of the transmission 2 through slits or openings 10 and 11. The slit 10 leading into the interior of the fluid transmission 2 is connected with a conduit or passage 13 extending along the outer surface of the rotor of the turbine element 2'' and, through a passage 14 communicates with a space 15 formed at the end of the splined portion of the intermediate driven shaft 4. The latter is provided with a longitudinal bore 16 communicating with the space 15 at one end, and at its other end connected through the transverse opening 17 with a transverse canal 18. The latter, in turn, communicates through a suitable connecting joint 19 with a fluid supply conductor 20. The other opening 11 is connected with another transverse canal 21 which through a suitable joint 22 communicates with the outlet conductor 23.

The drive shaft 1 is preferably, though not necessarily, interconnected with the impeller elements 2' of the fluid transmission 2 and the claw teeth 3' of the clutch 3 through a suitable flywheel 24. The cooperating engageable clutch teeth 3'' of the clutch 3 are mounted upon one end of a hollow piston 25 which is rotatable with but slidable relatively to the turbine element 2'' of the fluid transmission 2 and the intermediate driven shaft 4. The closed end of the piston 25 is mounted subject to the fluid pressure within the space 15, whereby variations of pressure within this space 15 control the position of the piston 25 and thus the engagement of its teeth 3'' with the teeth 3'. A spring 26 opposes movement of the piston 25 against the pressure developed within the space 15.

The manner in which the pressure within the space 15 is varied to effect engagement or disengagement of the clutch 3 is illustrated by the control system shown in Fig. 2. As there indicated, a valve 27, a cooling device 28 and a pump 29 are included in the fluid circuit. When the valve 27 is in the position shown, permitting relatively unobstructed flow of the fluid, the pressure within the space 15 will be insufficient to move the piston 25 to cause engagement of the clutch 3. However, when the fluid circuit is closed or throttled by the valve 27, the pressure within the fluid piston and more specifically within the space 15 will increase to such an extent as to move the piston 25 against the force of the spring 26, and thereby it causes engagement of the clutch 3.

Control of the valve 27 is effected through a suitable link rod 31 which may be moved into or out of engagement with the clutch pedal 32, operating the friction clutch 5 in a suitable well known manner (not shown). When the link rod 31 is in the position indicated in solid lines, movement of the clutch pedal 32 will act to move the valve 27 to a closed or throttled position against the force of a suitable spring 33. When, however, the link rod is in the position 31', movement of the clutch pedal 32 will be ineffective to vary the position of the valve 27.

The operation of the aforedescribed apparatus and system will now be traced. For normal use in which the power is transmitted through the fluid transmission 2, the link rod controlling the valve 27 will be in the position 31', so that engagement or disengagement of the friction clutch 5 by the clutch pedal 32 will have no effect upon the mechanical clutch 3. If, however, it is desired to eliminate the fluid transmission 2 and effect the drive through a rigid coupling, the link rod 31 is moved into such a position that it is engageable by the clutch pedal 32. Downward movement of the pedal 32 will, therefore, not only disengage the clutch 5, but, by moving the valve 27 to its throttling position will increase the pressure within the fluid piston and accordingly within the space 15 to drive the piston 25 to the left, as seen in Fig. 1, and cause engagement of the teeth 3' and 3" of the clutch 3. This engagement is facilitated by the fact that when the friction clutch 5 is disengaged, the piston 25, being rotatable with the turbine element 2", will rotate at approximately the same speed as the drive shaft 1. Upon release of the clutch pedal 32 the friction clutch 5, of course, becomes re-engaged, and at first the mechanical clutch will remain engaged because of the pressure still existing within the space 15. By the time the latter has fallen off, due to return of the valve 27 to its open position, the tooth friction between the teeth 3' and 3" of the mechanical clutch 3 will be sufficient to maintain the engagement and direct drive. If, now, it is desired to release the mechanical clutch 3 and return to transmission through the fluid transmission 2, the link rod is returned to its position 31' and the clutch pedal 32 again depressed. As a result of the disengagement of the intermediate driven shaft 4 from the load, the tooth friction between the clutch teeth 3' and 3", which heretofore maintained the engagement of the clutch 3, now ceases and the clutch 3 is accordingly released; this release is possible because, since the link rod was moved to the position 31', depression of the clutch pedal 32 did not move the valve 27 to the throttled position. Accordingly, the pressure within the space 15 is not now sufficient to overcome the force of the spring 26. Release of the clutch pedal 32 now re-engages the friction clutch 5 and the power transmission will take place as before through the fluid transmission 2.

From the above, it will be seen that I have provided an arrangement which quickly and easily permits the alternative use of fluid or mechanical drive. Additionally, the construction is such that as contrasted to prior proposed arrangements, this combined type of drive is extremely simple and sure of operation, and is also so arranged that it does not occupy any more space than the usual fluid drive. A further simplification and saving of space results from utilization of the fluid for the fluid transmission for actuation of the alternative mechanical coupling.

It will be obvious to those skilled in this art that many modifications in the proposed construction can be effected. For example, the claw clutch 3 may be replaced by other types of suitable clutches, including, for example, a friction clutch. The fluid pressure for operating the clutch control piston 25 need not be derived from the circuits supplying the fluid transmission, but may come from a separate source such, for example, as the lubricating system of the vehicle. It will also be clear to those skilled in this art that the present invention is clearly usable with all systems involving control of the reaction elements.

The principles of the present invention are equally applicable to all types of vehicles, including tractors, caterpillar vehicles, railway cars, locomotives and water vehicles.

Having described an illustrative embodiment of the invention, it is pointed out that various changes and modifications therein may be made without departing from the invention as set forth in the following claims:

1. In combination, a source of power including a drive shaft, a driven shaft, a fluid transmission including an impeller element connected to said drive shaft and a cooperating turbine element connected to said driven shaft, a clutch having cooperating elements respectively connected to said turbine and impeller elements, and a pressure-operated piston mounted substantially coaxially with said fluid transmission for actuating said clutch.

2. In combination, a source of power including a drive shaft, an intermediate shaft, a fluid transmission including an impeller element connected to said drive shaft and a cooperating turbine element connected to said intermediate shaft, a driven shaft, a first clutch interconnecting said intermediate shaft and said driven shaft, a second clutch having cooperating elements connected to said turbine and impeller elements, control means for releasing and engaging said first clutch, and means for actuating said second clutch upon movement of said control means to its clutch-releasing position.

3. The combination according to claim 2, in which said last means are movable out of engagement with said clutch control means.

4. The combination according to claim 2, in which said last means includes a pressure-operated piston, a source of fluid, conduits guiding said fluid for operation upon said piston, and valve means movable with said control means for varying the pressure of said fluid upon said piston.

5. The combination according to claim 2, in which said second clutch comprises a claw clutch having teeth rotatable with said impeller element, teeth rotatable with said turbine element, and spring means for normally preventing engagement of said teeth.

6. A power transmitting device comprising, in combination, a fluid transmission having cooperating impeller and turbine elements, means for rotatably supporting said impeller and turbine elements, a driven shaft extending co-axially interiorly of said transmission and connected for rotation with said turbine element, a piston slidably but non-rotatably connected to said turbine element, mounted co-axially with but spaced from the end of said driven shaft, means for supplying piston-operating fluid to the space between said driven shaft and said piston, a drive shaft connected to said impeller element, and clutch means operated by said piston for interconnecting said impeller and turbine elements.

7. The combination according to claim 6, in which said fluid transmission is provided with cooling conduits interconnecting said space with the working circuits between the impeller and turbine elements.

8. In combination, a source of power including a drive shaft, a driven shaft, a fluid transmission including an impeller shaft connected to said drive shaft and a cooperating turbine element connected to said driven shaft, a claw clutch having teeth rotatable with said impeller element, teeth rotatable with said turbine element, a pressure-operated piston for actuating said clutch, and spring means operating oppositely to the force of said piston for normally preventing engagement of said teeth.

JOSEF BUCHHART.